April 11, 1933.  J. F. LABOON ET AL  1,903,510
PLANT CONSTRUCTION
Filed March 10, 1930
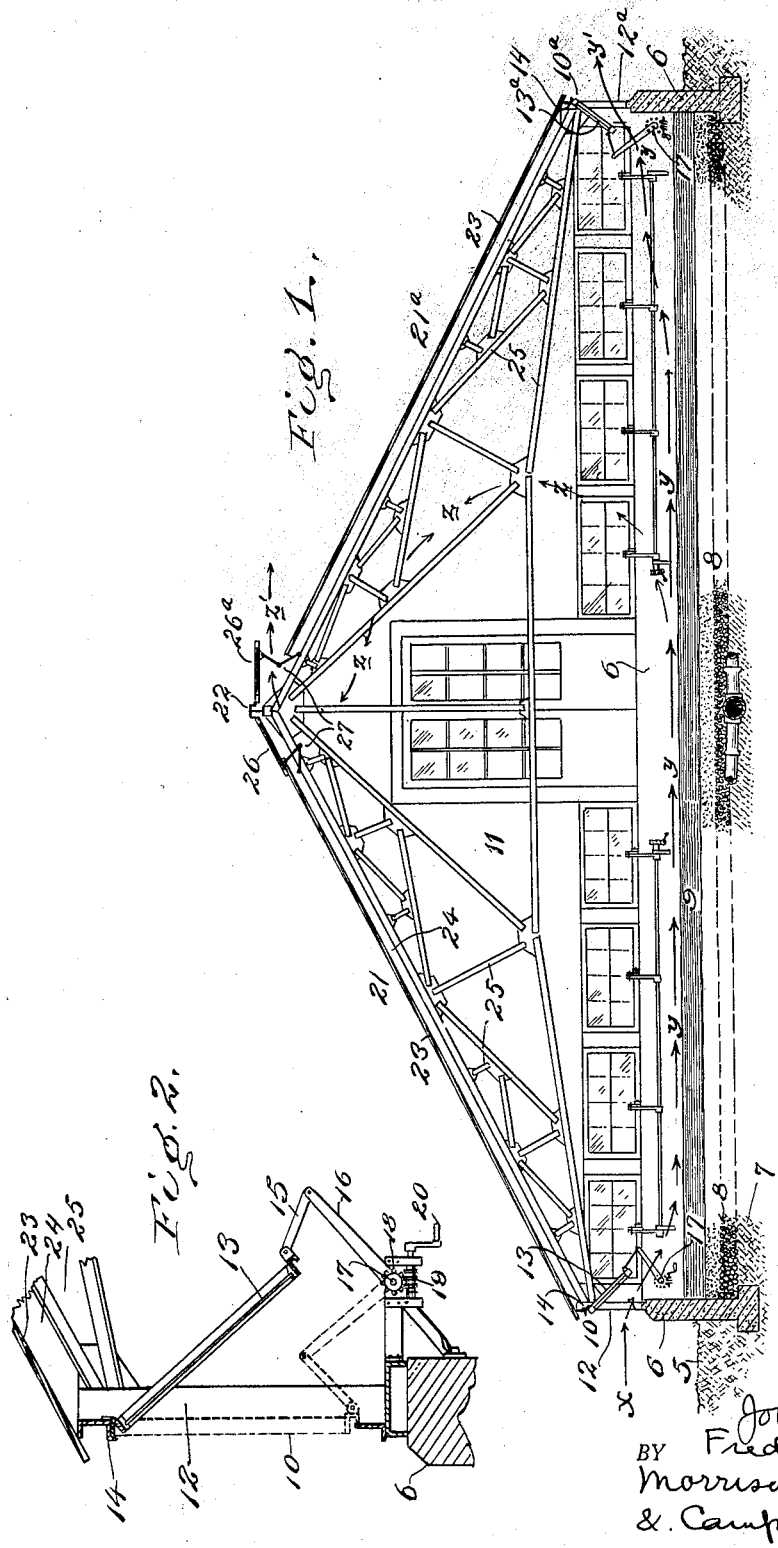

Patented Apr. 11, 1933

1,903,510

UNITED STATES PATENT OFFICE

JOHN F. LABOON, OF PITTSBURGH, PENNSYLVANIA, AND FREDERICK B. BARNS, OF NEW YORK, N. Y.; SAID BARNS ASSIGNOR TO DONALD CAMPBELL, OF NEW YORK, N. Y.

PLANT CONSTRUCTION

Application filed March 10, 1930. Serial No. 434,804.

This invention is a novel plant construction, and relates more particularly to the construction and operation of plants or buildings wherein processes are to be performed or substances are to be treated, the general object being the increase of efficiency of operation of such plants.

While the present invention is usefully available with plants or buildings of various types and for various purposes or industrial uses, a typical embodiment has been selected for illustration herein consisting in a plant or structure for the evaporation or drying of sludge, for example sewage sludge, wherein the vapors produced by the evaporation constitute an obstruction to efficiency and are, with this invention, swept away and removed with rapidity. Typically, the heat for drying or evaporating the sludge or other substance may be afforded, wholly or partially, by solar heat, the plant for this purpose then being covered by a glazed structure or glass roof, admitting the sun's rays for the described purposes; although heat may be applied from underneath or in other known ways for various treatments.

Other commercial or industrial uses of the invention include its application to foundries, or to chemical works, for the rapid and efficient clearing away from the floor or lower part of the working space of the fumes and smoke resulting from the processes or treatments carried on, and various other uses of the invention will suggest themselves.

Among the objects of the invention are, as indicated, the thorough and efficient displacement and removal of vapors, gases and the like tending to accumulate near the working floor of various plants; this being effected with this invention by a control of natural air currents so as to sweep across the working space adjacently above the floor, affording not only an improved efficiency of clearing action, but an increase and acceleration of air flow. Particularly, in the case of a working space heated by solar rays the interior atmosphere is cleared, thus permitting more efficient penetration of the rays to the working floor of the plant. By the present invention, affording a steady horizontal air travel across the working floor or sludge trays or beds, the result or output of operation is very materially increased; for example in a sludge drying plant a substantially greater percentage of sludge may be dried in a given period of time as compared with known sludge beds. The present plant construction also protects the working space and process from interference by rain or snow.

Other and further objects and advantages of the present invention will be pointed out in the hereinafter following description of a typical embodiment thereof or will be understood to those conversant with the subject. To the attainment of such objects and advantages the present invention consists in the novel plant construction, and the novel features of combination, arrangement, operation and detail herein described or illustrated.

In the accompanying drawing Fig. 1 is a general vertical cross sectional view of a plant constructed in accordance with the present invention, the same being partly diagrammatic in character.

Fig. 2, on a larger scale, is a similar view of a detail comprising one of the side wall sashes and its adjusting means.

In one aspect the present invention may be generally described as a plant construction which comprises the lateral walls and roof enclosing the working space of the plant, above the interior floor or ground, one or more or all of the exterior walls, exposed to atmospheric air currents, being formed with a system of sash openings of substantial height and size, located somewhat above the ground line, and each of such openings being provided with an air-deflecting sash which is arranged to be maintained at what may be described as an inward-downward incline; whereby natural air currents flowing toward such wall or walls at the windward side or sides of the plant may be caused to enter the plant at a descending slant at each sash opening and thence to flow across the interior working space adjacent to the floor for exit at the lee side of the plant, a similar or other suitable exit opening, or series of openings, being provided at the lee side for such discharge.

The drawing shows the ground level at 5 with concrete wall base sections 6 standing above the ground level and surrounding the interior space or floor, which may, for example, be constructed with an underneath concrete layer or base 7. In the case of a sludge drying plant the floor base may give support to a layer or layers 8 of gravel, sand or other porous material, upon which the bed or layer of sludge 9 is introduced in any desired manner. The operations are preferably by batch rather than continuously, each charge of sludge being introduced, dried and removed before another charge is introduced.

Above the wall base section 6 are the lateral side walls 10 at the left and 10$^a$ at the right. For purposes of illustration it is herein assumed that there are natural air currents flowing from the left to the right, thus tending to enter by the left or windward wall 10 and leave by the right or lee wall 10$^a$, as indicated by the arrows.

A typical size for a small sludge drying plant is 43 feet in length and 30 feet in width, with the side wall base sections 6 about 1½ feet above the ground and the side walls 6 feet high above the base sections, and the roof of double pitch rising to a central ridge. A larger plant may be 100 by 40 feet or larger. The long side walls 10 and 10$^a$ are provided with a system of sashes in accordance with this invention. The end walls 11 may or may not be similarly constructed. If the side and end walls are all provided with this invention then in the case of a diagonal flow of air one side wall and one end wall may be considered as the windward walls, the air entering and traversing the working space and leaving by the opposite side and end walls.

Each of the walls which is provided with the present invention has a series or horizontal system or row of sash openings 12 of substantial width and height, and each of these openings is shown as occupied by a sash 13. The sash openings and the sashes at the right or lee side are indicated as 12$^a$ and 13$^a$ respectively. If two rows of openings and sashes are provided at each site, all of the sashes may be adjusted in the same manner, or in some cases differently.

Each sash 13 is shown as preferably top-hung, or arranged to swing about a horizontal fulcrum or hinge 14 at or near its uppermost edge, so that when swung inwardly the sash will take an inward-downward incline. This arrangement gives the full benefit of the sash opening area for the admission of natural air currents, tends to admit maximum inflow of air, and most effectively directs the inflow of air at a downward slant to travel horizontally across the plant adjacent to the floor. Each of the sashes 13 or 13$^a$ is preferably a glazed sash so as to admit light to the interior of the plant.

It may be desirable to set each system of sashes to different inclines under different conditions, and for this purpose devices for adjusting and holding the sashes in various adjusted positions are indicated. Thus to each sash is attached a link 15 extending to a lever arm 16 projecting from a shaft 17 mounted in suitable bearings and carrying a worm wheel 18 operated by a worm 19 which may be turned, for example manually by a crank 20, so that in one operation all of the sashes along one side of the plant may be simultaneously and equally adjusted.

Preferably each adjusting mechanism is capable of setting the sashes to a slant anywhere between 0° or closed position and 45° or open position. The best angle of adjustment may depend on various factors such as the velocity and pressure of the air currents or wind, also the outside temperature thereof, also the interior conditions and the presence of obstructions at or near the floor. The best adjustment may be determined by test whenever desired. For example the plant may be provided with anemometers at various points, and vanes indicating the direction of air movement, so that the direction and velocity of air flow at various points near and removed from the floor may be observed; or a simpler and more direct test is to ignite a number of smoke pots or candles adjacent the windward side of the plant and observe the path of the smoke traveling into and through the plant, while the sashes are set to give the best path and speed of flow within the plant.

The roof is shown as comprising a left section 21 and a right section 21$^a$ at the windward and lee sides respectively with a ridge 22 at the peak. Various types of roof may be employed but that disclosed is typical. In the case of a sewage sludge treating plant it is preferable to employ solar heat and light, and for this purpose the roof sections 21 and 22 are shown as composed of glass 23 arranged as panes held in a suitable metallic framework 24 and supported by trusses 25. The light and heat of the sun's rays may afford sufficient action for sewage sludge treatment to dispense with any artificial heating.

It is substantially advantageous to provide, in addition to the wall openings and sashes, a system of roof openings with sashes therein. Thus the windward section 21 of the roof is shown as having a system of sashes 26 which are preferably closed, while the lee roof section 21$^a$ has a system of sashes 26$^a$ shown in open position, although under certain conditions both series of roof sashes may be maintained closed and the lee wall openings relied upon for proper discharge of the air flow. Adjusting devices 27 are indicated similar to those for the side wall sashes, except that the ridge sashes preferably open outwardly.

The operation, with the wind blowing from the left, as shown by arrows $x$, is that the full air flow toward the sash openings is received therein and directed downwardly by the properly inclined sashes and compelled to strike the floor or bed, along which it travels across the width of the plant, adjacently above the floor, as indicated by arrows $y$. The lee sashes are preferably adjusted to an inward-downward incline, so that the flow or travel is smoothly outward to open air, as at $y'$.

The particular value of the roof openings and sashes, which are shown located near the ridge, is in the case of very light natural currents of air, which are reenforced by the action resulting from the opening of the ridge sashes at the lee side of the roof. This is due to the fact that the vertical dimension of the working space affords the effect of a stack, the warm air and vapors tending to rise and taking their exit by the lee roof sashes, thus promoting substantially the rate of flow of air through the plant without detracting from the effective disposition of the air currents adjacent to the floor. A portion of the flow across the floor will be diverted into an ascending path, such as shown by the arrows $z$, curving around and back and finally out by the lee ridge sashes at $z'$. With the ridge sashes closed, the flow at $z$ will not occur, and the path will be as at $x, y, y'$.

In either case the process or treatment, such as sludge drying, is materially quickened, due to the clearing out of the loaded air stream and its replacement by new flow, thus maintaining the requisite difference in vapor tension between the atmosphere in the plant, and the moisture in the sludge.

It will thus be seen that there has been described a plant construction embodying the principles and attaining the objects of the present invention. Since many matters of combination, arrangement, operation and detail may be variously modified without departing from the principles of the invention, it is not intended to limit the invention to such matters except to the extent set forth in the appended claim.

What is claimed is:

In a sewage drying plant the combination of the lateral walls and roof enclosing the working space, such walls having a base section standing above the ground level and thereabove a substantially continuous horizontal series of sash openings in a location elevated substantially above the ground level, an enclosed base adapted to hold a bed of sewage sludge to be dried by evaporation, at a level substantially below said sash openings, and a series of air deflecting sashes in said openings set at an inward-downward incline and with the lower inner edges of such sashes spaced inwardly of the wall; whereby at the windward side natural air currents entering said openings are diverted by the sashes to flow at a descending slant on to the sludge bed and thence across the working space adjacent to the sludge bed and thence ascendingly for continuous discharge of vapors beneath the sashes at the lee side of the plant.

In witness whereof, we have affixed our signatures hereto.

JOHN F. LABOON.
FREDERICK B. BARNS.